United States Patent [19]

Hansen et al.

[11] 4,393,350

[45] Jul. 12, 1983

[54] METHOD FOR RAPIDLY DETECTING SUBTERRANEAN TUNNELS BY DETECTING A NON-NULL VALUE OF A RESULTANT HORIZONTAL MAGNETIC FIELD COMPONENT

[75] Inventors: Peder M. Hansen; John G. Hoffman; Elwin W. Seeley; Wesley A. Andrew, all of San Diego, Calif.

[73] Assignee: The United States of America as represented by the Secretary of the Navy, Washington, D.C.

[21] Appl. No.: 264,754

[22] Filed: May 18, 1981

Related U.S. Application Data

[62] Division of Ser. No. 31,721, Apr. 20, 1979, Pat. No. 4,290,020.

[51] Int. Cl.³ .............................................. G01V 3/08
[52] U.S. Cl. .................................... 324/334; 324/345
[58] Field of Search ............................ 324/334–336, 324/359, 326, 345

[56] References Cited

U.S. PATENT DOCUMENTS

| 1,660,774 | 2/1928 | Vos et al. ........................ 324/359 |
| 1,678,489 | 7/1928 | Sundberg ........................ 324/334 |
| 1,960,028 | 5/1934 | Ricker ............................ 324/334 |
| 2,560,834 | 7/1951 | Whitehead et al. ............ 324/334 X |
| 2,730,673 | 1/1956 | Jakosky .......................... 324/359 X |
| 2,731,596 | 1/1956 | Wait et al. ...................... 324/335 |
| 4,079,309 | 3/1978 | Seeley ............................ 324/359 X |

FOREIGN PATENT DOCUMENTS

| 21610 | of 1913 | United Kingdom ............ 324/334 |
| 223540 | 8/1924 | United Kingdom ............ 324/334 |

*Primary Examiner*—Gerard R. Strecker
*Attorney, Agent, or Firm*—Robert F. Beers; Ervin F. Johnston; Edmund W. Rusche, Jr.

[57] ABSTRACT

Method and apparatus for detecting tunnels, voids or other anomalies beneath an area of the earth's surface wherein an oscillator couples a current into two conductors laid parallel to each other to generate two magnetic fields in the earth beneath the area. The magnetic field is measured along a line midway between the two horizontal conductors to detect for an increase in the measured field which is an indication of the presence of an anomaly.

2 Claims, 5 Drawing Figures

METHOD FOR RAPIDLY DETECTING SUBTERRANEAN TUNNELS BY DETECTING A NON-NULL VALUE OF A RESULTANT HORIZONTAL MAGNETIC FIELD COMPONENT

This is a division of application Ser. No. 31,721, filed Apr. 20, 1979, and which issued as U.S. Pat. No. 4,290,020 on Sept. 15, 1981.

BACKGROUND OF THE INVENTION

The present invention relates to a method and apparatus for the detection and location of subterranean anomalies, and particularly, to such method and apparatus for detecting tunnels or other void spaces within the earth.

Geological surveying by electromagnetic means has been done for many years. The techniques that have been used involved the detection of changes in the earth's resistivity by measurements in mutual coupling between a transmitter antenna (i.e., a long wire or small horizontal loop) and a receive antenna located on or near the earth's surface. This technique works good for large anomalies (i.e. gravel pits, large oil or ore deposits, etc.) and small anomalies located near the earth's surface. These techniques involve an averaging of the earth's resistivity and how much an anomaly will change this total average. Other techniques involved are the use of DC probes and the plotting of the potential lines. This technique is slow and is limited to shallow anomalies. Another method involved the drilling of two boreholes parallel to one another and doing transmission line experiments. This technique is useful but expensive to do considering the cost of drilling.

SUMMARY OF THE INVENTION

The present invention provides for the detection and location of subterranean tunnels, voids and other anomalies. Two magnetic fields are established by passing current in two parallel wires laid out horizontally on the earth's surface in the general area in which an anomaly is known or suspected to be. Magnetic field null measurements are made along a center line between the parallel wires. The presence of a tunnel warps or distorts the magnetic fields and causes the signal level to increase when the measurement is made over the tunnel or void beneath.

OBJECTS OF THE INVENTION

An object of the present invention is to provide a new, improved and rapid system for detecting subterranean anomalies.

Another object of the invention is to provide a new and rapid system for detecting the presence of a tunnel beneath the given area.

A further object of the invention is the provision of a method and apparatus for rapidly detecting anomalies below the earth's surface using a nulling technique which allows for cancelation of large surface effects and permits detection of small anomalies.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
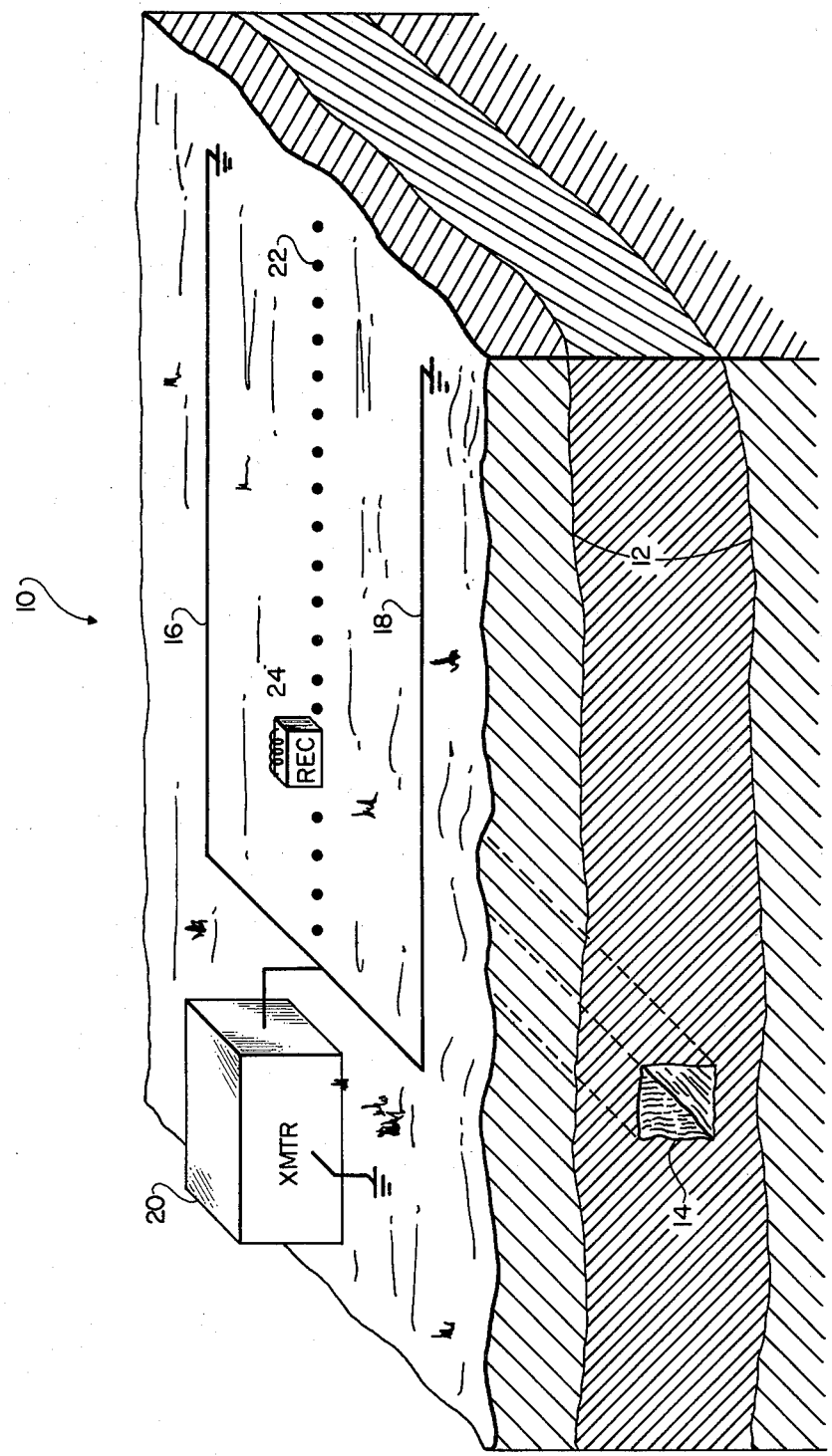
FIG. 1 shows an embodiment of the invention using the vertical null technique.

Referring now to FIG. 1, there is shown an area of the earth's surface and the subsurface region beneath it which comprises arbitrary strata or other solid matter separated by lines 12. Tunnel 14 which may be an open-ended passageway or other space devoid of solid matter passes through the subsurface region beneath area 10 at depths which may be in excess of 170 feet, the cross-sectional dimension of tunnel 14 being arbitrary. In addition, tunnel 14 may or may not contain a linear conductive structure such as steel tracks.

In the configuration shown in FIG. 1, two long (~500 meters) parallel wires, 16 and 18 are laid out on the ground parallel to each other with each terminated in their characteristic impedance to ensure uniform in phase currents in both wires. Conductors or wires 16 and 18 are fed by means of a transmitter 20.

Transmitter 20 supplies an alternating current to conductors 16 and 18 which in the configuration of FIG. 1 will produce fields that are equal and opposite along the center line 22 between the two wires producing a resultant null in the vertical magnetic field. Any asymmetrical properties in the geology, as for example, tunnel 14 in FIG. 1 will produce a horizontal shift in the vertical null position resulting in an increase in the measured field along the center line between the two wire configuration. As shown in FIG. 1, the magnetic field is measured along a center line 22 by means of a receiver 24 which includes a ferrite loop antenna and tuned volt meter.

Figure 2:
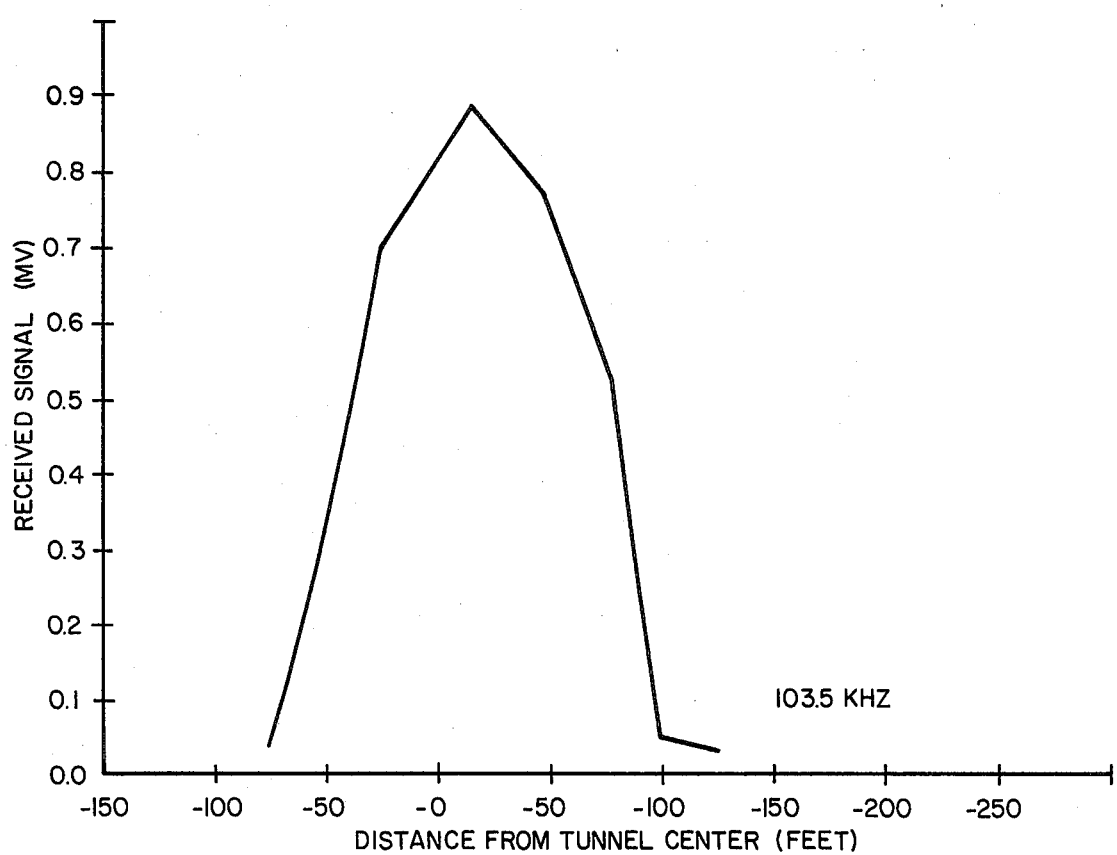
FIG. 2 is a graph of measurements made according to the embodiment of FIG. 1.

FIG. 2 is a graph of the null voltages Vs distance from the center of the empty tunnel shown in FIG. 1. As can be seen, the maximum reading occurs directly above the center of the tunnel indicating maximum shift of the vertical null caused by the presence of the tunnel.

Figure 3:
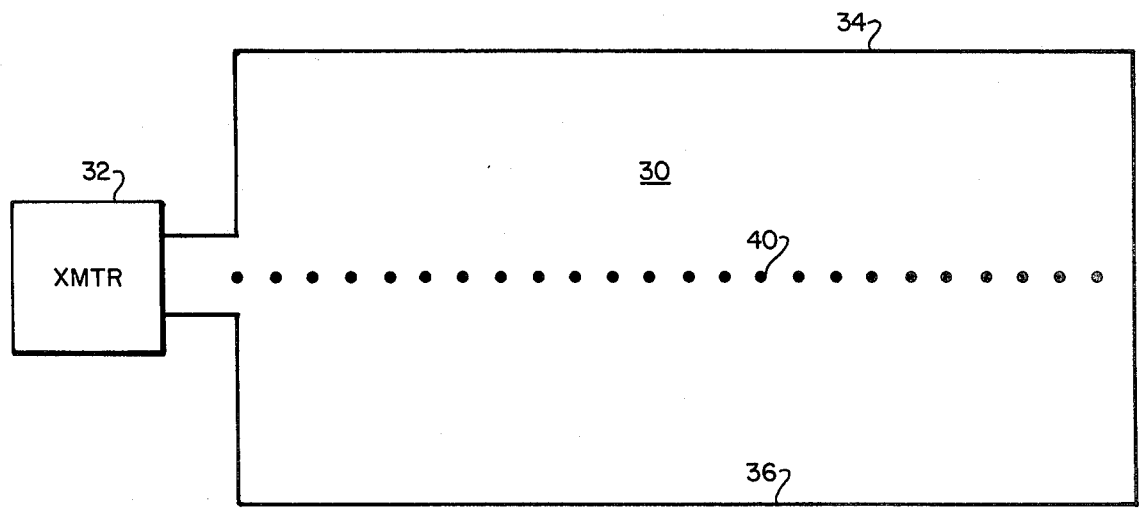
FIG. 3 is an embodiment using the horizontal loop or horizontal null technique.
Figure 4:
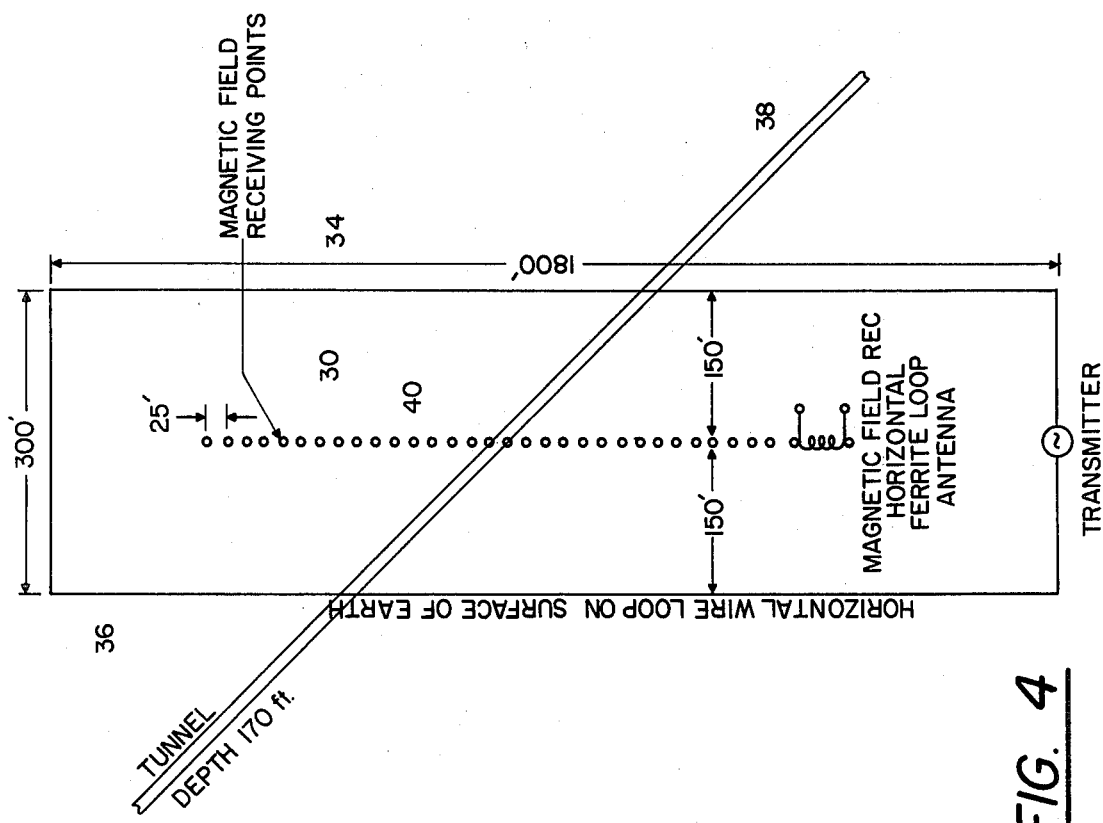
FIG. 4 shows the embodiment of FIG. 3 used to detect a railroad tunnel.

The configuration shown in FIGS. 3 and 4 comprises a large rectangular loop 30 laid out on the ground with the transmitter 32 inserted in one end to provide currents moving in opposite directions in the long side wires of 34 and 36 of the loop. As shown in FIG. 4, the long side wires 34 and 36 are oriented at about 45° to the tunnel 38. Any angle but zero degrees has been found to work satisfactorily. This embodiment has been found to also work in situations where metal may be present as, for example, railroad tracks in a railroad tunnel.

In the embodiments of FIGS. 3 and 4, since the current is flowing in opposite directions in the side wires 34 and 36, null measurements of the combination of the magnetic fields created by the currents can be rapidly made along center line 40 by measuring a horizontal null. This is because the horizontal components of each magnetic field are essentially 180° out of phase with each other.

The operation of the two systems is essentially the same, any asymmetric anomaly will cause a shift in the location of the horizontal or vertical field null at the measurement center line.

In practice, the embodiment of FIG. 1 has been found to be more satisfactory in detecting voids while the embodiment of FIGS. 3 and 4 has been found satisfactory to additionally detect voids where metal is present. The frequency of the current flowing in the parallel wires may range from 10 kHz to 110 kHz and may be generated by means of a Hewlett-Packard HP204B signal generator fed into a power amplifier to feed a low level signal ranging from 7–150 milliamperes.

The ferrite antenna of the receiver 20 should be mounted such that it is rotatable for locating minimum magnetic field signals in the plane perpendicular to the long wires 16 and 18 of FIG. 1 and horizontal to the two long wires 34 and 36 of the horizontal loop of FIGS. 3 and 4.

Figure 5:
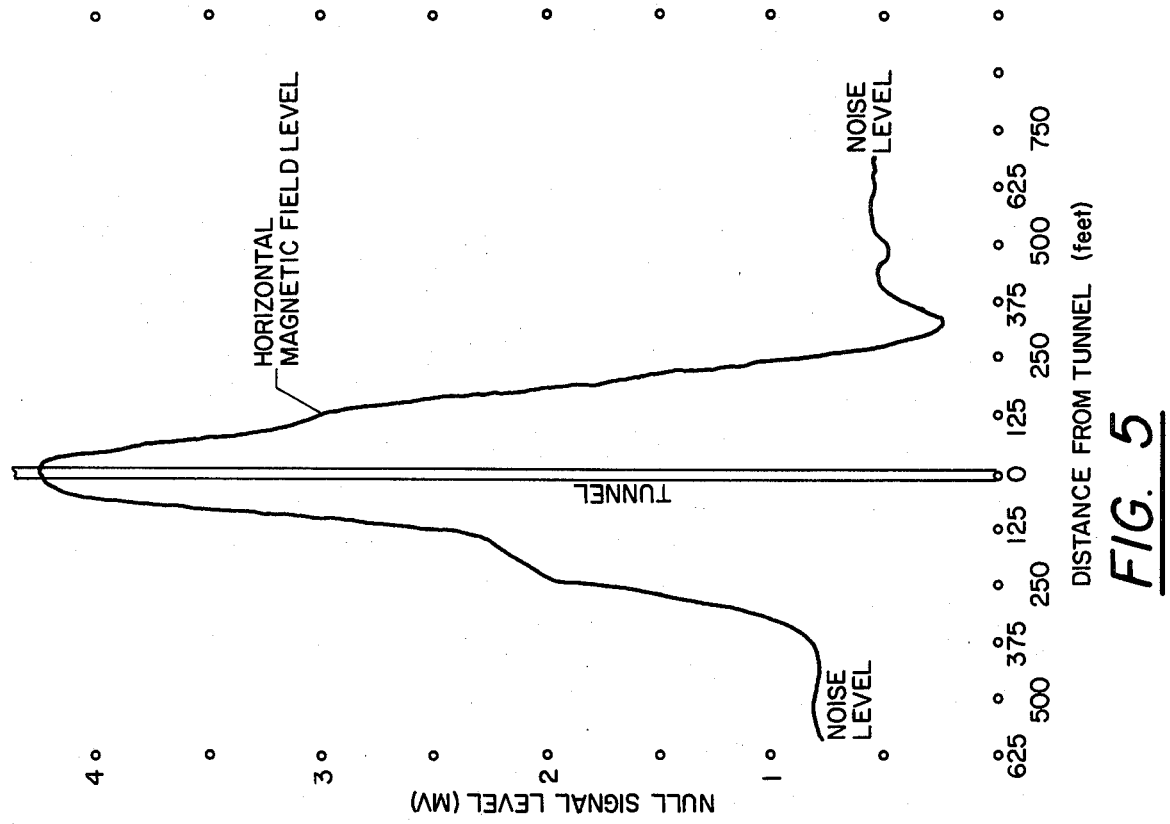
FIG. 5 is a graph of measurements taken over a tunnel in accordance with the embodiment of FIGS. 3 and 4.

FIG. 5 is a graph of the null voltage Vs distance from the center of a tunnel in which railroad tracks are present. As stated above, the rectangular loop is at approximately 45° to the tunnel 38. The presence of the tunnel warps the magnetic fields and causes the signal level to increase to a maximum over the tunnel as shown in FIG. 5. The equipment should be calibrated to be nulled to the noise level in the absence of a tunnel. This is done by measurements taken a great distance from the known location of tunnel as shown in FIG. 5.

Obviously, many other modifications and variations of the present invention are possible in the light of the above teachings. It is therefore to be understood that within the scope of the appended claims the invention may be practiced otherwise than as specifically described.

What is claimed is:

1. A method for rapidly detecting subterranean tunnels using primary magnetic fields generated by electrical conductors placed on the earth's surface in a manner such that the conductors are parallel and the lenghts thereof are several times greater than the distance separating them comprising the steps of:
   generating two separate ac primary magnetic fields at a predetermined frequency in a manner that the resultant horizontal component of the magnetic fields along a preselected line on the earth's surface is a null when the surrounding region is characterized with homogeneous electromagnetic properties;
   measuring said resultant horizontal component of the magnetic fields along said preselected line; and
   detecting the occurrence of a nonnull measurement as an indication of the location of a subterranean tunnel.

2. A method for rapidly detecting subterranean tunnels comprising the steps of:
   placing a single conductor on the surface of the earth in a manner that two parallel sides are formed with lengths several times greater than the distance separating them;
   feeding an alternating electric current to the conductor at a preselected frequency;
   measuring the horizontal component of a resultant magnetic field created by the electric current in the conductor, said measurement occurring on the earth's surface along the centerline between the two parallel sides of the conductor; and detecting a nonnull magnetic field value as evidence of the location of a subterranean tunnel.

* * * * *